US009862389B2

(12) United States Patent
Cho

(10) Patent No.: US 9,862,389 B2
(45) Date of Patent: Jan. 9, 2018

(54) SHIFTING CONTROL METHOD FOR VEHICLE

(71) Applicant: Hyundai Motor Company, Seoul (KR)

(72) Inventor: Sung Hyun Cho, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 53 days.

(21) Appl. No.: 15/062,884

(22) Filed: Mar. 7, 2016

(65) Prior Publication Data

US 2017/0101099 A1 Apr. 13, 2017

(30) Foreign Application Priority Data

Oct. 8, 2015 (KR) .................. 10-2015-0141295

(51) Int. Cl.
*B60W 30/188* (2012.01)
*B60W 10/02* (2006.01)
*B60W 10/06* (2006.01)
*B60W 10/113* (2012.01)
(Continued)

(52) U.S. Cl.
CPC .......... *B60W 30/188* (2013.01); *B60W 10/02* (2013.01); *B60W 10/06* (2013.01); *B60W 10/113* (2013.01); *B60W 30/19* (2013.01); *F16H 61/04* (2013.01); *B60W 2510/0208* (2013.01); *B60W 2510/0638* (2013.01); *B60W 2510/0657* (2013.01); *B60W 2510/1005* (2013.01); *B60W 2510/1015* (2013.01); *B60W 2710/027* (2013.01); *B60W 2710/0666* (2013.01); *B60W 2710/1005* (2013.01)

(58) Field of Classification Search
None
See application file for complete search history.

(56) References Cited

U.S. PATENT DOCUMENTS 5,079,970 A * 1/1992 Butts ............... B60W 10/06 192/109 F
5,172,602 A * 12/1992 Jurgens ............ F16H 61/0437 701/51
(Continued)

FOREIGN PATENT DOCUMENTS

JP H09-242572 9/1997
JP 2998485 11/1999
(Continued)

*Primary Examiner* — Justin Holmes
(74) *Attorney, Agent, or Firm* — Brinks Gilson & Lione

(57) ABSTRACT

A shifting control method for a vehicle including: a shifting requirement determination step in which a controller determines whether power-on downshifting is required and whether a gear level when shifting is started is equal to or greater than a fourth gear; a first torque crossing step in which, when power-on downshifting is required from the gear level equal to or greater than the fourth gear, torque of a first clutch is decreased and torque of a second clutch is increased; a gear manipulation step in which, when the first clutch is released by the first torque crossing step, a target gear is engaged by manipulating a synchronizer while the torque of the second clutch is maintained; and a second torque crossing step in which, when the target gear has been engaged by the gear manipulation step, the first clutch is engaged and the second clutch is released.

5 Claims, 3 Drawing Sheets

(51) Int. Cl.
*B60W 30/19* (2012.01)
*F16H 61/04* (2006.01)

(56) References Cited

U.S. PATENT DOCUMENTS

| | | | | |
|---|---|---|---|---|
| 6,319,170 | B1* | 11/2001 | Hubbard | B60W 30/1819 477/107 |
| 2011/0259134 | A1* | 10/2011 | Siebigteroth | F16H 61/688 74/325 |
| 2015/0166039 | A1* | 6/2015 | Cho | F16H 61/0437 701/54 |
| 2015/0258982 | A1* | 9/2015 | Tanaka | B60K 6/36 477/5 |
| 2015/0276052 | A1* | 10/2015 | Lochocki, Jr. | F16H 61/12 701/55 |
| 2016/0069453 | A1* | 3/2016 | Atmaram | F16H 59/46 192/3.61 |

FOREIGN PATENT DOCUMENTS

| | | |
|---|---|---|
| JP | 2011-79379 | 4/2011 |
| JP | 2013-57373 | 3/2013 |
| JP | 2015-78706 | 4/2015 |
| KR | 10-2010-0088801 | 9/1997 |
| KR | 10-2014-0048532 | 4/2014 |
| KR | 10-2015-0059910 | 6/2015 |

\* cited by examiner

SHIFTING CONTROL METHOD FOR VEHICLE

CROSS REFERENCE TO RELATED APPLICATION

The present application claims priority to and the benefit of Korean Patent Application No. 10-2015-0141295, filed Oct. 8, 2015, which is incorporated herein by reference in its entirety.

FIELD

The present disclosure generally relates to a shifting control method for a vehicle.

BACKGROUND

The statements in this section merely provide background information related to the present disclosure and may not constitute prior art.

A torque assist Automated Manual Transmission (AMT) is a transmission configured to assist torque supplied to a driving wheel by adding an additional clutch that implements a second gear to a general AMT structure in order to inhibit or prevent a torque interruption while shifting from first to third gear is performed.

As mentioned above, the torque assist AMT may provide smooth shifting because a torque interruption is inhibited or prevented during shifting between low gears such as first and third gears. However, during shifting between gears higher than the third gear, torque interruption attributable to the conversion of a synchronizer is inevitable, as in the case of an existing common AMT.

SUMMARY

The present disclosure provides a shifting control method for a vehicle, the shifting control method being capable of lowering the sense of discontinuity of torque supplied to a driving wheel and improving the acceleration when power-on downshifting occurs as a driver steps on an acceleration pedal in a torque assist AMT, which implements a second gear only by the manipulation of a second clutch without the manipulation of a synchronizer so as to reduce a torque interruption using clutch-to-clutch shifting of first and second clutches when shifting between first and third gears is required.

A shifting control method of a vehicle according to the present disclosure includes: a shifting requirement determination step in which a controller determines whether power-on downshifting is required and whether a gear level, acquired when shifting is started, is equal to or greater than a fourth gear level; a first torque crossing step in which, when power-on downshifting is required from the gear level equal to or greater than the fourth gear level, torque of a first clutch is decreased and torque of a second clutch is increased; a gear manipulation step in which, when the first clutch is released by performing the first torque crossing step, a target gear is engaged by manipulating a synchronizer while the torque of the second clutch is maintained; and a second torque crossing step in which, when the target gear has been engaged by the gear manipulation step, the first clutch is engaged and the second clutch is released.

The torque of the first clutch may be gradually decreased and the torque of the second clutch may be gradually increased in the first torque crossing step; and target torque to be reached by increasing the torque of the second clutch may be calculated by multiplying the torque of the first clutch, acquired when shifting is started, by a gear ratio of a gear level, acquired when shifting is started, and by dividing a resultant value by a gear ratio of a second gear level.

The torque of the second clutch may be maintained to be the target torque in the gear manipulation step.

In the first torque crossing step, the torque of the first clutch may be decreased with a constant gradient and the torque of the second clutch may be increased with a constant gradient, in order to make a time at which the torque of the first clutch is released coincide with a time at which the torque of the second clutch reaches the target torque.

In the second torque crossing step, the torque of the second clutch may be decreased with a constant gradient and the torque of the first clutch may be increased with a constant gradient, in order to make a time at which the torque of the second clutch is released coincide with a time at which the torque of the first clutch becomes equal to engine torque.

When engine rpm is greater than rpm of an input shaft of a target gear level while the gear manipulation step is performed, a request for decreasing engine torque may be made.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
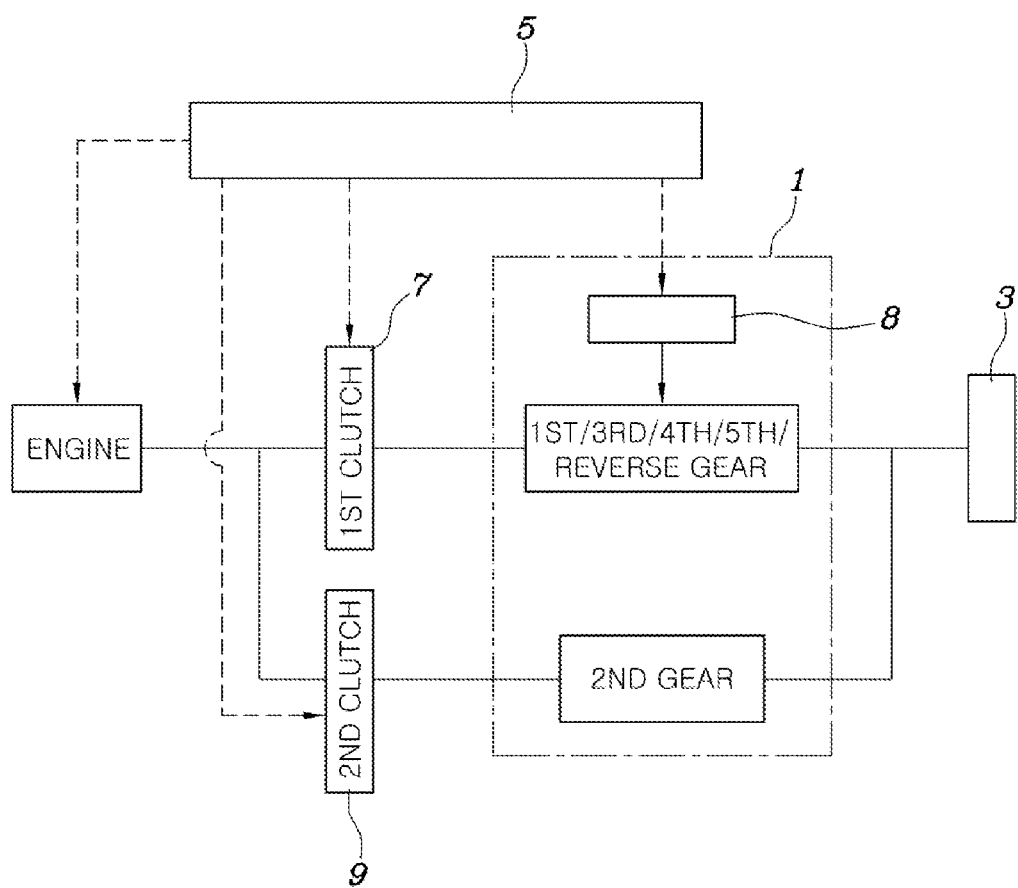
FIG. 1 is a concept diagram illustrating an example of a torque assist AMT to which the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a transmission 1 performs shifting between gears including first to fifth gears by receiving engine torque in order to supply torque to a driving wheel 3. A controller 5 performs shifting for gears excluding a second gear, which is similar to the case of an existing common AMT, namely, the controller 5 engages a first clutch 7 after the engagement state of the gear is changed by manipulating a synchronizer 8 under the condition that the fist clutch 7 is released. Also, the controller 5 may perform shifting between the second gear and another gear just by converting the engagement states of the first clutch 7 and the second clutch 9.

In other words, the second gear connected to the second clutch 9 does not include a separate synchronizer, and when the second clutch 9 is engaged, engine torque is immediately changed according to the second gear ratio to be supplied to the driving wheel.

Figure 2:
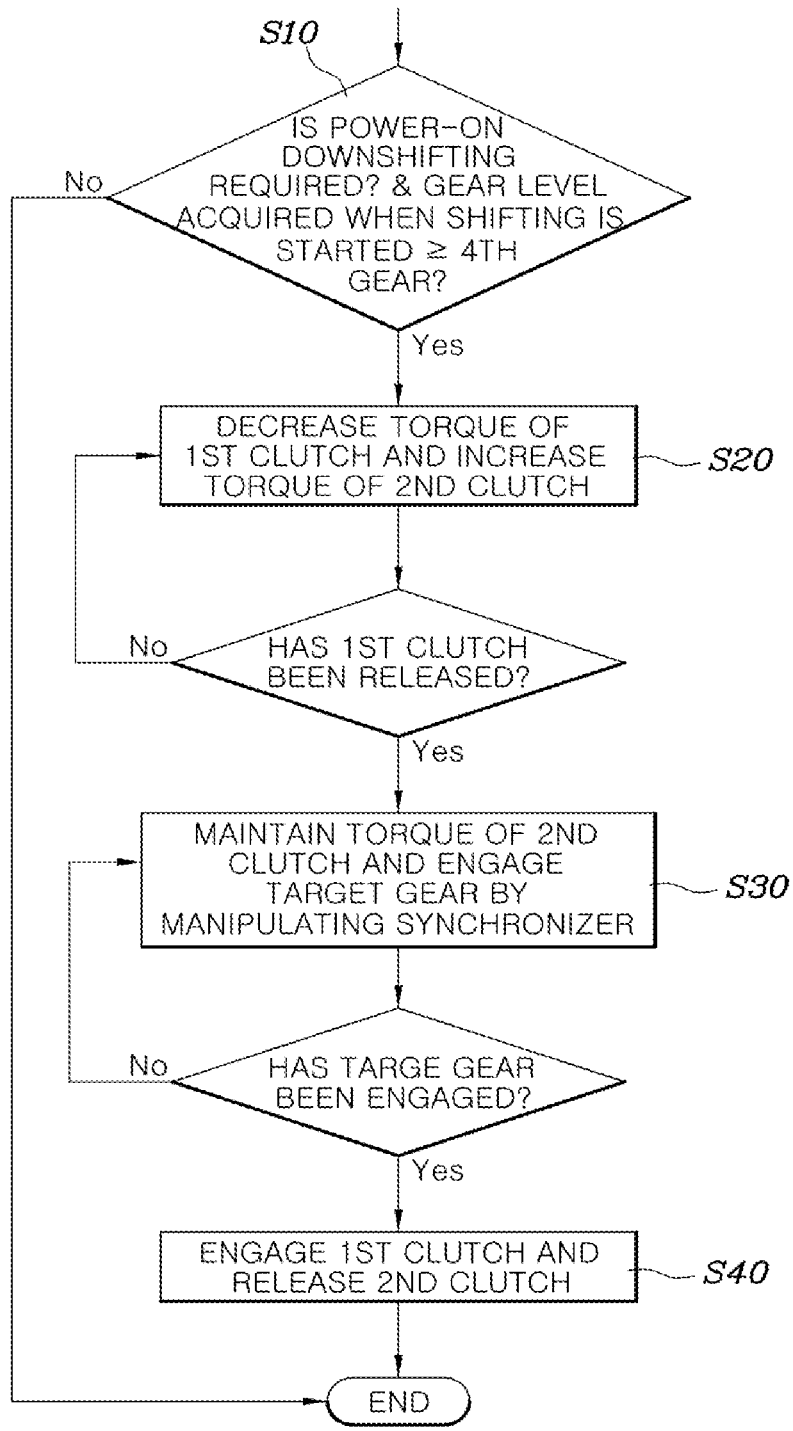
FIG. 2 is a flowchart illustrating a shifting control method for a vehicle.

Referring to FIG. 2, an embodiment of the present disclosure includes: a shifting requirement determination step (S10) in which the controller 5 determines whether power-on downshifting is required and whether a gear level, acquired immediately before shifting is performed, is equal to or greater than the fourth gear level; a first torque crossing step (S20) in which, when power-on downshifting is required from a gear level that is equal to or greater than the fourth gear level, the torque of the first clutch is decreased but the torque of the second clutch is increased; a gear manipulation step (S30) in which, when the first clutch is released by the first torque crossing step, a target gear is engaged by manipulating a synchronizer while the torque of the second clutch is maintained; and a second torque crossing step (S40) in which, when the engagement of the target gear has been completed by the gear manipulation step, the first clutch is engaged but the second clutch is released.

In other words, according to the shifting control method of the present disclosure, when power-on downshifting, which requires shifting into a lower gear, occurs as a driver steps on an accelerator pedal while a vehicle is being driven in a gear level equal to or greater than the fourth gear, shifting into a target gear is performed, but because the second clutch may deliver torque to a driving wheel while the first clutch is released for the manipulation of a synchronizer, a torque interruption state, in which neutral feel is generated by the discontinuity of torque during shifting, may be inhibited or prevented and the acceleration of the vehicle may be improved.

In the first torque crossing step (S20), the torque of the first clutch is gradually decreased and the torque of the second clutch is gradually increased.

In this case, the target torque of the second clutch may be calculated by multiplying the torque of the first clutch, acquired when shifting is started, by the gear ratio of the gear level acquired when the gear shifting is started, and then by dividing the result by the gear ratio of the second gear level.

Therefore, as the gear level when shifting is started is higher, the actual torque delivered through the second clutch is decreased, and if the gear level when shifting is started is the fourth gear, the largest torque is supplied to the driving wheel through the second clutch, whereby more torque may be supplied to the driving wheel in the relatively lower gear level.

In the gear manipulation step (S30), the torque of the second clutch is maintained to be the target torque.

Figure 3:
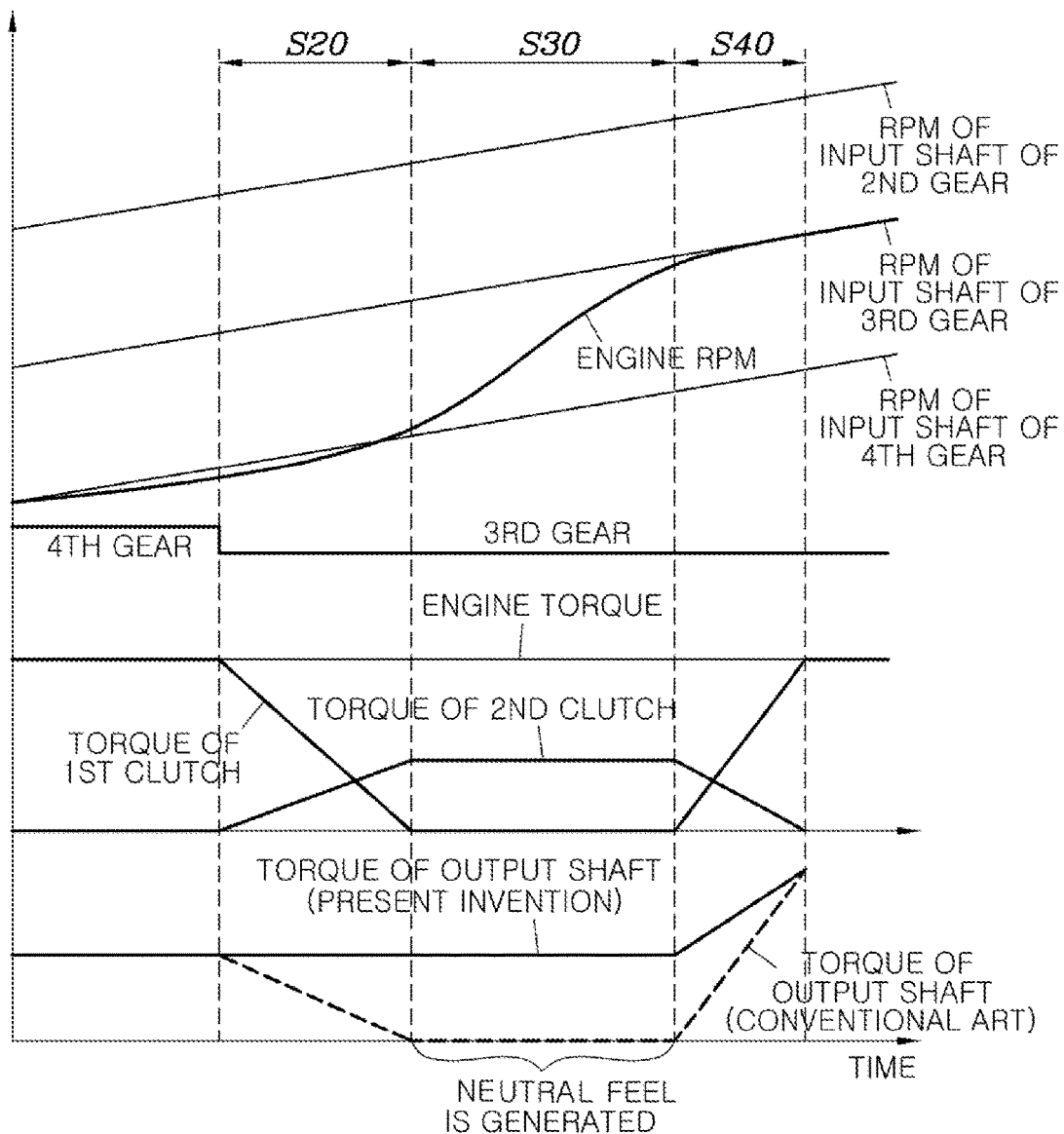
FIG. 3 is a graph explaining an embodiment of a shifting control method for a vehicle.

For example, as illustrated in FIG. 3, if the gear level when shifting is started is the fourth gear and a target gear level is the third gear, the torque of the second clutch is maintained to be constant and the synchronizer is changed from the fourth gear engagement state into a second gear engagement state during the gear manipulation step after the first torque crossing step (S20) is performed.

This situation corresponds to a torque interruption state in the case of a conventional art, but according to the present disclosure, constant torque is supplied to the driving wheel through the second clutch, whereby a vehicle may be provided with continuous acceleration capability that provides a driver with a sense of superior acceleration.

As illustrated in FIG. 3, in the first torque crossing step (S20), in order to make the time at which the torque of the first clutch is released coincide with the time at which the torque of the second clutch reaches the target torque, it is desirable to control the torque of the first clutch to be decreased with a constant gradient and the torque of the second clutch to be increased with a constant gradient because a shifting shock may be prevented by the gradual torque changes.

Also, in the second torque crossing step (S40), in order to make the time at which the torque of the second clutch is released coincide with the time at which the torque of the first clutch becomes equal to engine torque, it is desirable to control the torque of the second clutch to be decreased with a constant gradient and the torque of the first clutch to be increased with a constant gradient because the shifting shock may be inhibited or prevented by the gradual torque changes.

Meanwhile, when the rpm of the engine is greater than the rpm of the input shaft of the target gear level while the gear manipulation step (S30) is performed, the controller requests a decrease in engine torque to restrain an excessive increase in the engine speed and to acquire the synchronization speed.

The present disclosure may lower the sense of a discontinuity of torque supplied to a driving wheel, which may be caused by a torque interruption, and improve the acceleration when power-on downshifting occurs as a driver steps on an acceleration pedal in a torque assist AMT, which implements a second gear only by the manipulation of a second clutch without the manipulation of a synchronizer so as to reduce the torque interruption through clutch-to-clutch shifting of first and second clutches when shifting between first and third gears is required.

Although exemplary embodiments of the present disclosure has been described for illustrative purposes, those skilled in the art will appreciate that various modifications, additions and substitutions are possible, without departing from the scope and spirit of the present disclosure.

What is claimed is:

1. A shifting control method for a vehicle, comprising:
   a shifting requirement determination step in which a controller determines whether power-on downshifting is required and whether a gear level, acquired when shifting is started, is equal to or greater than a fourth gear level;
   a first torque crossing step in which, when power-on downshifting is required from the gear level equal to or greater than the fourth gear level, torque of a first clutch is decreased and torque of a second clutch is increased;
   a gear manipulation step in which, when the first clutch is released by performing the first torque crossing step, a target gear is engaged by manipulating a synchronizer while the torque of the second clutch is maintained; and
   a second torque crossing step in which, when the target gear has been engaged by the gear manipulation step, the first clutch is engaged and the second clutch is released,
   wherein when revolutions per minute (rpm) of an engine are greater than rpm of an input shaft of a target gear level while the gear manipulation step is performed, a request for decreasing engine torque is made.

2. The shifting control method of claim 1, wherein:
   the torque of the first clutch is decreased and the torque of the second clutch is increased in the first torque crossing step; and
   a target torque to be reached by increasing the torque of the second clutch is calculated by multiplying the torque of the first clutch, acquired when shifting is started, by a gear ratio of a gear level, acquired when shifting is started, and by dividing a resultant value by a gear ratio of a second gear level.

3. The shifting control method of claim 2, wherein the torque of the second clutch is maintained to be the target torque in the gear manipulation step.

4. The shifting control method of claim 1, wherein in the first torque crossing step, the torque of the first clutch is decreased at a constant inclination and the torque of the second clutch is increased at a constant inclination, in order to make a time at which the torque of the first clutch is released coincide with a time at which the torque of the second clutch reaches the target torque.

5. The shifting control method of claim 1, wherein in the second torque crossing step, the torque of the second clutch is decreased at a constant inclination and the torque of the first clutch is increased at a constant inclination, in order to make a time at which the torque of the second clutch is released coincide with a time at which the torque of the first clutch becomes equal to engine torque.

* * * * *